Nov. 6, 1951 C. W. JOY 2,574,107
ROD CLAMPS
Filed Oct. 19, 1944 2 SHEETS—SHEET 1

Charles Wallace Joy
INVENTOR.
By Otto Munk
his ATTY.

Nov. 6, 1951  C. W. JOY  2,574,107
ROD CLAMPS

Filed Oct. 19, 1944  2 SHEETS—SHEET 2

CHARLES Wallace Joy
INVENTOR
By [signature]
his ATTY

Patented Nov. 6, 1951

2,574,107

UNITED STATES PATENT OFFICE 2,574,107

ROD CLAMP

Charles Wallace Joy, Hawthorn,
Victoria, Australia

Application October 19, 1944, Serial No. 559,391
In Australia March 22, 1944

12 Claims. (Cl. 254—29)

This invention relates to a clamp for attachment to rods and is particularly, though not exclusively, adaptable for use in building and moulding structures wherein a rod or bar secures in position in assembly either temporarily or permanently members of the structure.

In one known arrangement for securing such rods in position, in building structures or concrete forms, wherein it is only necessary to prevent axial movement along the rod in one direction to thereby restrain movement in the form, the rods are cut to the required length, threaded at the ends and then secured to the structure in the required position by means of terminal nuts. This thread cutting operation is laborious and time wasting and furthermore is an expensive operation having regard to the comparative short life of the thread cutting dies.

The principal objective of the present invention is to provide a clamp of simple and cheap construction adapted, when positioned on any portion of a rod and located against a fixed abutting surface, to prevent relative axial movement of said clamp in a direction tending to release the rod or the abutting surface.

With the above stated objective in view, a clamp according to the present invention comprises a body having spaced inclined portions converging outwardly towards each other formed with peripheral rod gripping edges defining a tapered aperture in said body for the entry of the rod to be gripped by said edges, at least one of which latter comprises a knife edge and is inclined to a plane normal to the axis of the rod in a direction so as to effect in the assembled position pressure engagement between the clamp and an abutting surface to impart tension to said rod.

The pressure engagement between the clamp and an abutting surface and the tension imparted to the rod secures the clamp in position and tightens the rod while the construction and arrangement of said gripping edges is such that axial movement of the rod in a direction against the inclined projecting portions defining the tapered aperture cause one or both of said edges to bite more deeply into the rod so as to restrain said axial movement.

In one embodiment of the invention one or both gripping edges are serrated whereby, when the clamp is secured to the abutting surface, forces tending to rotate the rod effects a deeper bite of the gripping edges into the rod.

In order to prevent spreading of the gripping edges of the clamp when in operative position, means are provided to reinforce the body portion of the clamp to prevent such spreading movement. Alternatively a portion of the clamp abutting softer material is provided with edges adapted to be embedded in the abutment and so prevent spreading. The rod to which the clamp is applicable may be of any cross-section, viz: circular, hexagonal, square, rectangular or triangular or flexible as wire rope hereinafter and in the appended claims termed "a rod."

Practical embodiments of clamps constructed in accordance with the present invention are illustrated in the accompanying drawings.

Figure 1:
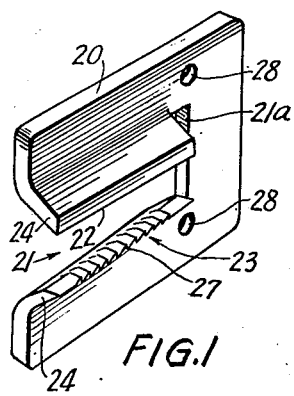
Fig. 1 is a perspective view of one embodiment of the invention in which the rod gripping edges comprise a sharp tapered edge and a relatively broader serrated edge.
Figure 2:
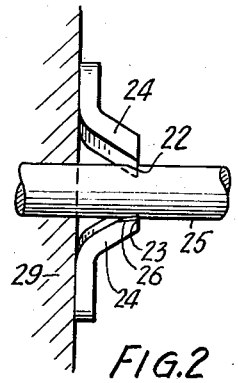
Fig. 2 is an end elevation of the embodiment shown in Fig. 1 with the clamp in operative position.
Figure 3:
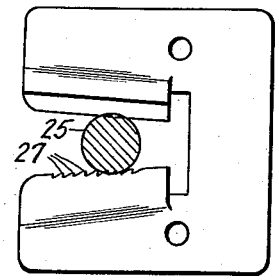
Fig. 3 is a front elevation thereof.
Figure 4:
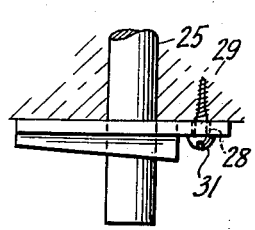
Fig. 4 is a plan view of the clamp in operative position.

Illustrated in Figs. 1 to 4 inclusive the clamp comprises a body portion 20 formed of hardened steel plate having formed therein a tapered aperture 21. The edges 22 and 23 of the aperture 21 are formed by spaced inclined portions 24 which project towards each other. The edges 22 and 23 are inclined to a plane normal to the axis of the rod 25 (see Fig. 4).

The edge 22 of the aperture 21 is formed to provide a sharp cutting edge and the opposite edge 23 has an inwardly extending area 26 which is provided with transverse serrations 27.

The aperture 21 is enlarged at the inner portion 21a to readily permit the edges 22 and 23 to be shaped and inclined as above described and apertures 28 are provided in the body portion 20 of the clamp to enable the clamp to be secured and prevented from rotating when in an operative position on a rod.

In operation the clamp is positioned so that the rod enters the aperture 21 and the edges 22 and 23 engage opposite peripheral sides of the rod 25 (see Figs. 2, 3 and 4), and also the rear face of the clamp abuts the outer surface of member 29, through which the rod 25 passes.

Figure 5:
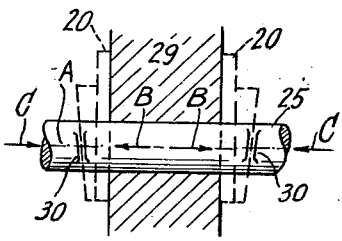
Fig. 5 is a view illustrating the wedging action imparted by the inclined rod gripping edge of the clamp.

The clamp is then driven onto the rod 25 to cause the edges 22 and 23 to bite into the periphery of said rod at an inclination as at 30 in Fig. 5 which illustrates the rod 25 as being secured at both ends by a clamp.

The inclination of the rod engaging edges 22 and 23 to a plane normal to the axis A of rod 25 effects a wedging action to press the clamp body 20 against the outer face of member 29 and thereby imparts tension to the rod in the direction shown by arrows B in Fig. 5.

The projecting portions 24, carrying the gripping edges 22 and 23 provide an arrangement whereby when the clamp abuts the fixed surface axial movement of the rod is prevented in a direction tending to release the rod (indicated by arrows C in Fig. 5).

Forces tending to move the rod in the direction indicated causes the edges 22 and 23 to bite more deeply in the rod 25, as hereinafter more fully explained. Furthermore, when the clamp body 20 is secured to the surface of member 29 by means of screws 31 or the like passing through the apertures 28 to prevent rotation of the clamp about the axis of the rod, forces tending to rotate the rod cause the latter, by reason of the serrations 27 in area 26 of edge 23 to advance further into the tapered aperture 21 and consequently cause the edges 22 and 23 to bite more deeply into the rod.

Figure 6:
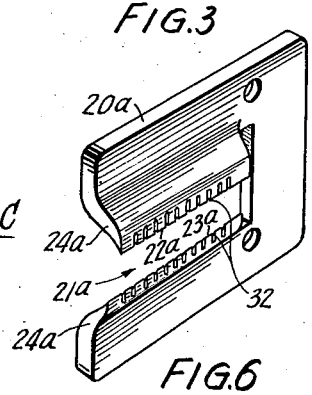
Fig. 6 is a perspective view of a further embodiment of the invention in which the rod gripping edges comprise two sharp tapered edges.
Figure 7:
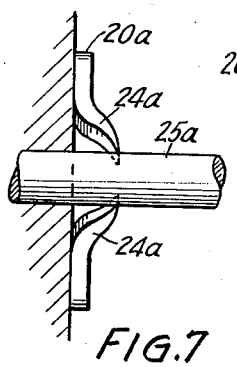
Fig. 7 is an end elevation of the embodiment shown in Fig. 6 with the clamp in operative position.
Figure 8:
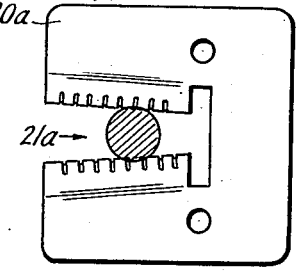
Fig. 8 is a front elevation thereof.

Figs. 6, 7 and 8 illustrate a clamp in which a tapered aperture 21a provided in a similar manner as above described and in this embodiment the rod gripping edges 22a and 23a comprise sharp cutting edges serrated as at 32. In this embodiment both the edges 22a and 23a formed integral with the body 20a by spaced inclined portions 24a are offset relatively to the body portion 20a of the clamp and are also inclined to a plane normal to the axis of the rod 25a. The operation of this embodiment is similar to that described with reference to Figs. 1 to 5, the serrations 32 operating in a similar manner to the serration 27 described with reference to Figs. 1 to 4.

Figure 9:
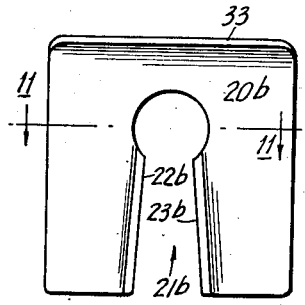
Fig. 9 is a front elevation of a further embodiment of the invention illustrating a clamp having modified form of rod gripping edges.
Figure 10:
Fig. 10 is a plan view of the embodiment shown in Fig. 9.
Figure 11:
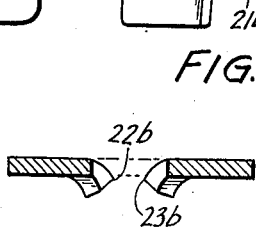
Fig. 11 is a sectional view on line 11—11 of Fig. 9.

Illustrated in Figs. 9 to 11 inclusive are views of a further embodiment of the invention in which the tapered aperture 21b is formed by a straight cut in the body portion 20b comprising a hardened plate. The rod gripping edges 22b and 23b are formed by outwardly bending the opposed edges of the aperture 21b in such manner that an inclination is imparted to said gripping edges 22b and 23b. Both these edges 22b and 23b comprising plain sharp edges as illustrated.

The top peripheral edge 33 of the body portion 20b is bent outwardly as at 34 to provide a surface that may readily receive hammer blows when placing the clamp onto a rod.

Figure 12:
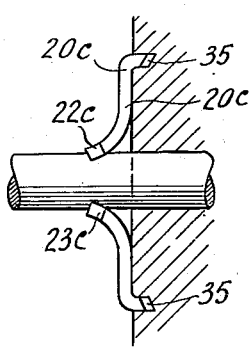
Figs. 12 and 13 are end and side views respectively of a clamp constructed in accordance with the invention in which tapered peripheral edges of the body portion are provided with means for gripping the surface which the clamp abuts.
Figure 13:
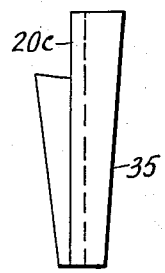

Figs. 12 and 13 illustrate a modification to the body portion 20c of the clamp, and in which sharp tapered edges 35 are formed integrally with the said body portion.

The edges 35 are adapted to bite into an abutting surface when the clamp is being placed in operative position (as illustrated in Fig. 12) and thereby form a reinforcement to the clamp body 20c to prevent spreading of the rod gripping edges 22c and 23c and also prevent rotation of the clamp body about the rod axis.

Figure 14:
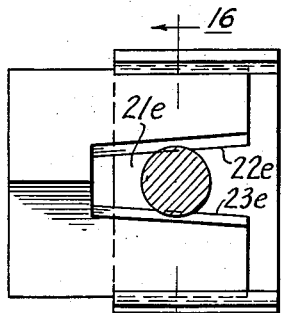
Figs. 14 and 15 are views in front elevation and plan of a further embodiment of the invention and in which the clamp is reinforced by means adapted to prevent spreading of the rod gripping edges and Fig. 16 is a section on line 16—16 of Fig. 14.
Figure 16:
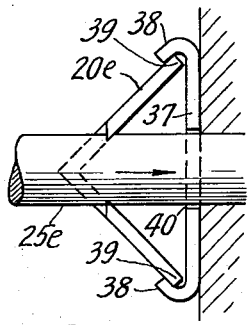
Figures 15, 17:
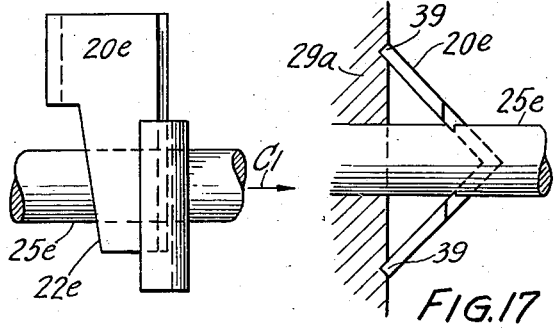
Fig. 17 is an end elevational view of the embodiment shown in Figs. 14, 15 and 16 without the reinforcement, and in which the edges of the clamp dig into the abutting surface.

Figs. 14, 15 and 16 illustrate a further embodiment of the invention in which the body portion 20e comprises a V-shaped plate and a tapered aperture 21e is formed therein by cutting away portion of the apex of said plate.

The rod gripping edges 22e and 23e of the tapered aperture comprise sharp cutting edges and are inclined to a plane normal to the axis of the rod 25e so that tension is applied to said rod when the clamp is driven onto the said rod. Furthermore forces tending to move the rod in the direction of arrow $C^1$ (Fig. 15) the edges 22e and 23e bite more deeply into said rod.

In order to provide a reinforcement to the body member 20e to prevent spreading of the gripping edges 22e and 23e and to provide a washer or equivalent bearing surface for the clamp a reinforcement plate 37 is provided.

Said plate 37 has formed thereon flanged sides 38 which are adapted to engage the peripheral edges 39 of the body member 20e of the clamp. The plate 37 is also provided with an opening 40 through which the rod 25e passes, said plate 37 being positioned on the said rod prior to the positioning of the clamp.

The plate 37 may be dispensed with and when the abutting surface 29a is wood as shown in Fig. 17 the edges 39 of the body of the clamp will under loading forces in the rod 25e embed into said surface and provide abutments for an arch formed by the body of the clamp.

A similar form of reinforcement plate may be provided with any of the above described embodiments where it is necessary to impart additional strength to the clamp or provide a bearing surface between the clamp and the abutting surface. Or such reinforcement may be provided by the body of the clamp itself.

Figure 18:
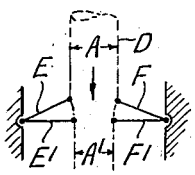
Figs. 18, 19 and 20 are diagrammatic views illustrating the gripping action of the clamp.
Figure 19:
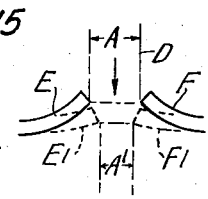

The toggle gripping action of the edges of the tapered aperture in the clamp is illustrated diagrammatically in Figs. 18 and 19, movement of the rod D in the direction of the arrow causes the edges represented at E and F in the normal position, to move to positions at $E^1$ and $F^1$ so that distance A is reduced to half at $A^1$ with a high lateral pressure which causes the teeth to cut into the rod or bar D. This allows the clamp to develop substantially the strength of the equivalent threaded portion of an equivalent bolt.

In practice the above described toggle action is obtained by the elastic bending of the projecting portions of the clamp body and which formed the tapered aperture and causes a tight grip of the gripping edges on the rod or bar and ensures that while some load is applied, vibration will not loosen the clamp.

Figure 20:
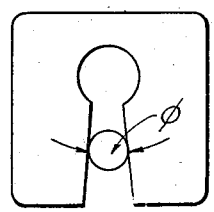

The angle $\phi$ between the edges of the tapered aperture (see Fig. 20) is selected so that $\phi/2$ is less than the angle $\theta$ when $\mu$ (the coefficient of friction of steel on steel) $=\tan \theta$ in the equation $\mu = \tan \theta$.

When this is so, positive force in the direction of the arrow must be applied to effect separation of the rod and clamp.

I claim:

1. A clamp for attachment to a rod comprising a V-shaped plate, a portion of the apex of which is formed with a tapered aperture for the entry of the rod to be gripped, and defined by peripheral rod gripping edges, which latter are inclined to a plane normal to the axis of the rod in a direction so as to effect in the assembled position pressure engagement between the clamp and an abutting surface to impart tension to said rod.

2. A clamp for attachment to a rod comprising a body having spaced inclined portions converging outwardly towards each other formed with peripheral rod gripping edges defining a tapered aperture in said body for the entry of the rod to be gripped by said edges, one of which latter is inclined to a plane normal to the axis of the rod in a direction so as to effect in the assembled position pressure engagement between the clamp and an abutting surface to impart tension to said rod, and means for reinforcing the said body to prevent spreading of said rod gripping edges.

3. A clamp for attachment to a rod comprising a V-shaped plate, a portion of the apex of which is formed with a tapered aperture for the entry of the rod to be gripped, and defined by peripheral rod gripping edges, which latter are inclined to a plane normal to the axis of the rod in a direction so as to effect in the assembled position pressure engagement between the clamp and an abutting surface to impart tension to said rod, and a flanged member adapted to engage peripheral edges of said plate to prevent spreading of said rod gripping edges.

4. A clamp for attachment to a rod comprising a body having spaced inclined portions converging outwardly towards each other formed with peripheral rod gripping edges defining a tapered aperture in said body for the entry of the rod to be gripped by said edges, at least one of which latter comprises a knife edge and is inclined to a plane normal to the axis of the rod in a direction so as to effect in the assembled position pressure engagement between the clamp and an abutting surface to impart tension to said rod, and peripheral edges in said body adapted to embed in the abutting surface to prevent spreading of said rod gripping edges.

5. A clamp for attachment to a rod comprising a body having spaced inclined parts formed thereon converging outwardly from said body towards each other and terminating in aligned rod gripping edges forming an aperture in said body for the entry of the rod to be gripped by said edges, said edges comprising a knife edge and a serrated edge, said edges being inclined to a plane normal to the axis of said rod, and said knife edge being arranged for inward deflection towards the axis of said rod when tension is imparted thereto, whereby said knife edge will be further embedded in said rod.

6. A clamp for attachment to a rod comprising a plate having spaced inclined parts formed thereon, said parts converging outwardly from said plate towards each other and terminating in aligned rod gripping edges forming a tapered aperture in said plate for the entry of said rod to be gripped by said edges, one of said edges consisting of a knife edge inclined to a plane normal to the axis of said rod and in alignment with the other rod gripping edge consisting of a serrated surface located in a plane substantially parallel to the axis of said rod, and with said knife edge arranged for inward deflection towards the axis of said rod when tension is imparted thereto whereby said knife edge will be further embedded in said rod.

7. A clamp for attachment to a rod comprising a body having spaced portions inclined to the axis of said rod and converging toward each other, said spaced portions terminating in aligned gripping edges forming an aperture in said body for the entry of said rod to be gripped by said edges, at least one of said rod gripping edges comprising a knife edge adapted to become embedded in said rod when said clamp is engaged upon said rod, said edges being inclined to a plane normal to the axis of said rod, and said knife edge being arranged for inward deflection towards the axis of said rod when tension is imparted to said rod, whereby said knife edge will be further embedded in said rod.

8. A clamp for attachment to a rod comprising a body having spaced portions formed thereon and inclined to the axis of said rod, said spaced portions converging outwardly from said body towards each other and terminating in rod gripping edges forming an aperture in said body for entry therein of said rod to be gripped by said edges, said edges comprising aligned knife edges each inclined to a plane normal to the axis of said rod and adapted to embed in said rod when said clamp is engaged upon said rod, said edges being arranged for inward deflection towards the axis of said rod when tension is imparted thereto, whereby said edges will be further embedded in said rod.

9. A clamp for attachment to a rod comprising a plate having spaced portions thereon inclined to the axis of said rod, said spaced portions converging outwardly from said plate towards each other and terminating in rod gripping edges forming an aperture in said plate for the entry therein of said rod to be gripped by said edges, said edges comprising aligned serrated edges each inclined to a plane normal to the axis of said rod and adapted to embed in said rod when said clamp is engaged upon said rod, said edges being arranged for inward deflection towards the axis of said rod when tension is imparted thereto, whereby said edges will be further embedded in said rod.

10. A clamp for attachment to a rod comprising a plate having spaced portions inclined to the axis of said rod and converging towards each other, said spaced portions terminating in rod gripping edges forming a tapered aperture in said plate for the entry therein of said rod to be gripped by said edges, at least one of said edges comprising a knife edge adapted to be embedded in said rod when said clamp is engaged upon said rod, said edges being inclined to a plane normal to the axis of said rod, and said knife edge being arranged for inward deflection towards the axis of said rod when tension is imparted thereto, whereby said edge will be further embedded in said rod.

11. A clamp for attachment to a rod comprising a plate having spaced inclined parts formed thereon, said spaced inclined parts converging outwardly from said plate and towards each other, and terminating in aligned rod gripping edges forming a tapered aperture in said plate for the entry therein of said rod to be gripped by said edges, said gripping edges comprising serrated edges inclined to a plane normal to the axis of said rod, and said edges being arranged for inward deflection about a point where said spaced inclined parts merge with said plate when tension is imparted to said rod, whereby said edges will be embedded in said rod.

12. A clamp for attachment to a rod comprising a body having spaced portions inclined to the axis of said rod and converging toward each other, said spaced portions terminating in aligned gripping edges forming an aperture in said body for the entry of said rod to be gripped by said edges, at least one of said rod gripping edges being a cutting edge adapted to become embedded in said rod when said clamp is engaged upon said rod, said edges being inclined to a plane normal to the axis of said rod, said cutting edge being arranged for inward deflection towards the axis of said rod when tension is imparted to said rod, whereby said cutting edge will be further embedded in said rod.

CHARLES WALLACE JOY.

REFERENCES CITED

The following references are of record in the file of this patent:

UNITED STATES PATENTS

| Number | Name | Date |
| --- | --- | --- |
| 623,508 | Betka | Apr. 25, 1899 |
| 1,244,499 | Hibbard | Oct. 30, 1917 |
| 1,487,184 | Saunier | Mar. 18, 1924 |
| 1,496,630 | Hendrickson | June 3, 1924 |
| 1,637,771 | Haug | Aug. 2, 1927 |
| 2,034,559 | Brunner | Mar. 17, 1936 |
| 2,162,349 | Hillberg | June 13, 1939 |
| 2,164,592 | Pilj | July 4, 1939 |